(12) United States Patent
Osuga et al.

(10) Patent No.: US 9,323,313 B2
(45) Date of Patent: Apr. 26, 2016

(54) ELECTRONIC CONTROL APPARATUS AND ONBOARD INFORMATION EQUIPMENT

(75) Inventors: Yoshiharu Osuga, Kobe (JP); Hirotoshi Matsuki, Tokyo (JP); Takashi Senoo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 326 days.

(21) Appl. No.: 13/822,305

(22) PCT Filed: Dec. 24, 2010

(86) PCT No.: PCT/JP2010/007493
§ 371 (c)(1),
(2), (4) Date: Mar. 12, 2013

(87) PCT Pub. No.: WO2012/085980
PCT Pub. Date: Jun. 28, 2012

(65) Prior Publication Data
US 2013/0179707 A1 Jul. 11, 2013

(51) Int. Cl.
*G06F 1/32* (2006.01)
*G06F 13/24* (2006.01)

(52) U.S. Cl.
CPC ............. *G06F 1/3234* (2013.01); *G06F 13/24* (2013.01)

(58) Field of Classification Search
CPC ................................ G06F 9/48; G06F 1/3234
USPC .................................................. 713/340, 310
See application file for complete search history.

(56) References Cited

U.S. PATENT DOCUMENTS

| | | | |
|---|---|---|---|
| 8,356,311 B2 * | 1/2013 | Wang et al. ................... | 720/602 |
| 8,520,477 B2 * | 8/2013 | Loges ........................ | 369/30.03 |
| 2003/0215681 A1 | 11/2003 | Appt et al. | |
| 2005/0068858 A1 * | 3/2005 | Proefrock et al. ......... | 369/30.36 |
| 2005/0114720 A1 * | 5/2005 | Nien et al. .................... | 713/320 |
| 2005/0182879 A1 * | 8/2005 | Vu ................................ | 710/260 |
| 2006/0067188 A1 | 3/2006 | Umehara et al. | |
| 2011/0129217 A1 * | 6/2011 | Dahlfort ........................ | 398/38 |

FOREIGN PATENT DOCUMENTS

| | | |
|---|---|---|
| JP | 7-175785 A | 7/1995 |
| JP | 9-44229 A | 2/1997 |
| JP | 9-209805 A | 8/1997 |
| JP | 10-152037 A | 6/1998 |
| JP | 11-288542 A | 10/1999 |

(Continued)

OTHER PUBLICATIONS

German Office Action, issued Jul. 28, 2014, for German Application No. 11 2010 006 079.7, along with a full English translation.

*Primary Examiner* — Vincent Tran
(74) *Attorney, Agent, or Firm* — Birch, Stewart, Kolasch & Birch, LLP (57) ABSTRACT

In response to an external interrupt signal input from a disk eject button 5 to an external interrupt port 2, a control unit 14 wakes up from a sleep mode and shifts to a regular operation mode. A wakeup counter 15 measures the number of times of wakeups. If the number of times of the wakeups reaches a predetermined number of times, an interrupt control unit 11 disables the external interrupt to the external interrupt port 2, and ignores the external interrupt signal thereafter, and the control unit 14 forcefully shifts from the regular operation mode to the sleep mode.

4 Claims, 6 Drawing Sheets

(56) References Cited

FOREIGN PATENT DOCUMENTS

| | | | |
|---|---|---|---|
| JP | 2002-49498 A | 2/2002 |
| JP | 2004-4013 A | 1/2004 |
| JP | 2006-215706 A | 8/2006 |
| JP | 2009-215795 A | 9/2009 |

* cited by examiner

PRIOR ART

PRIOR ART FIG.6

ELECTRONIC CONTROL APPARATUS AND ONBOARD INFORMATION EQUIPMENT

TECHNICAL FIELD

The present invention relates to an electronic control apparatus that wakes up in response to an external interrupt signal in a sleep mode of a microcomputer, and to onboard information equipment that incorporates the electronic control apparatus.

BACKGROUND ART

In onboard audiovisual equipment such as a disk playback apparatus like a CD (Compact Disc) player, an internal microcomputer (referred to as "micro" from now on) wakes up after accepting an IGN-on signal of an ignition (referred to as "IGN" from now on) switch, followed by various steps such as track up and track down for playback and selection of music of a disk, display of the track number and the time elapsed, ejection and absorption of a disk and increase or decrease of the volume.

When the IGN switch is turned off, the micro receives the IGN-off signal, executes sleep mode preprocessing such as the stop of playback of a disk, and shifts to a sleep mode.

Unless it shifts to the sleep mode at the IGN off, and hence the micro is in the wakeup mode, the clock for operating the micro continues an oscillating state, which is a factor in battery run-down because of a large consumption current. Accordingly, during the IGN off, it stops the oscillation of the clock for operating the micro and shifts to the sleep mode for stopping its operation, so that the micro can reduce the consumption current. This makes it possible to lower the current consumption of the micro and to prevent the battery run-down.

When the IGN switch is turned on from the IGN off again, the micro wakes up, starts oscillation of the clock to restart the operation and various processing. The term "wakeup" means that the clock for operating the micro moves from the stop state into the oscillating state.

On the other hand, some types of disk playback apparatus have an Anytime-Eject function. The term "Anytime-Eject function" means that during the IGN off (the micro is in a sleep mode), the micro temporarily wakes up in response to pushing down of the disk eject button of the disk playback apparatus and ejects a disk if it is left in the apparatus.

The following (1)-(4) are a background of providing the Anytime-Eject function for the onboard disk playback apparatus.

(1) A driver arrives at home while listening to a CD using an onboard disk playback apparatus, puts the car in the garage, and takes the key out of the ignition to stop the engine, thereby bringing the IGN in the off state. The onboard disk playback apparatus shifts to a sleep mode.

(2) When the driver opens the door and is going outside the car, he or she realizes that the CD is left in the onboard disk playback apparatus.

(3) The driver pushes down the disk eject button of the onboard disk playback apparatus to eject the CD.

(4) The onboard disk playback apparatus ejects the CD and the driver takes the CD from it.

In the foregoing (4), even if the onboard disk playback apparatus stops its operation in the IGN off state, the Anytime-Eject function enables the CD ejection operation. In contrast with this, without the Anytime-Eject function, unless the driver inserts the key and turns on the IGN switch to supply the power to the onboard disk playback apparatus, the CD ejection operation is not carried out. In other words, the Anytime-Eject function is used to eliminate the troublesome operation such as inserting the key again to turn the IGN on only to eject the CD.

If the CD is removed in the foregoing (4), the purpose is achieved. Thus the onboard disk playback apparatus moves to the sleep mode again. Unless the CD is removed, it moves to the sleep mode after absorbing the CD after a fixed time period has elapsed. Incidentally, unless the CD remains in the apparatus, since there is no CD to be ejected, it moves to the sleep mode promptly.

Here, the wakeup operation of the micro in a conventional onboard disk playback apparatus will be described.

Figure 5:
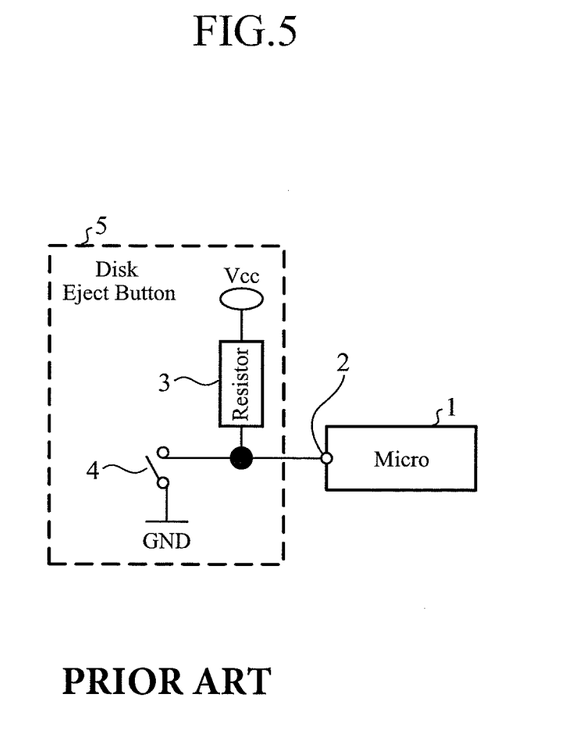
FIG. 5 is a diagram showing a configuration of a disk eject button of an onboard disk playback apparatus.

FIG. 5 is a diagram showing a configuration of a disk eject button of a conventional onboard disk playback apparatus. In the micro 1 that controls the operation of the disk playback apparatus, its external interrupt port 2 is connected to the GND via a push switch 4 constituting a disk eject button 5, and is connected to a power supply via a pull-up resistor 3.

While the push switch 4 is off (opened), the external interrupt port 2 is connected to the power supply via the pull-up resistor 3. Thus its electric level becomes High (referred to as [H] from now on).

While the push switch 4 is on (closed), the external interrupt port 2 is connected to the GND via the push switch 4. Thus its electric level becomes Low (referred to as [L] from now on).

In this way, when the disk eject button 5 is pushed down, the push switch 4 operates from open to close, and hence the external interrupt signal with the electric level [H]→[L] is input to the external interrupt port 2 of the micro 1. If the micro 1 detects the change of the electric level of the external interrupt port 2 ([H]→[L]) caused by pushing down the disk eject button 5 during the sleep mode, it decides that the external interrupt signal is input and wakes up.

Next, the operation will be described when the disk eject button 5 is pushed down while the micro 1 is in the sleep mode.

Figure 6:
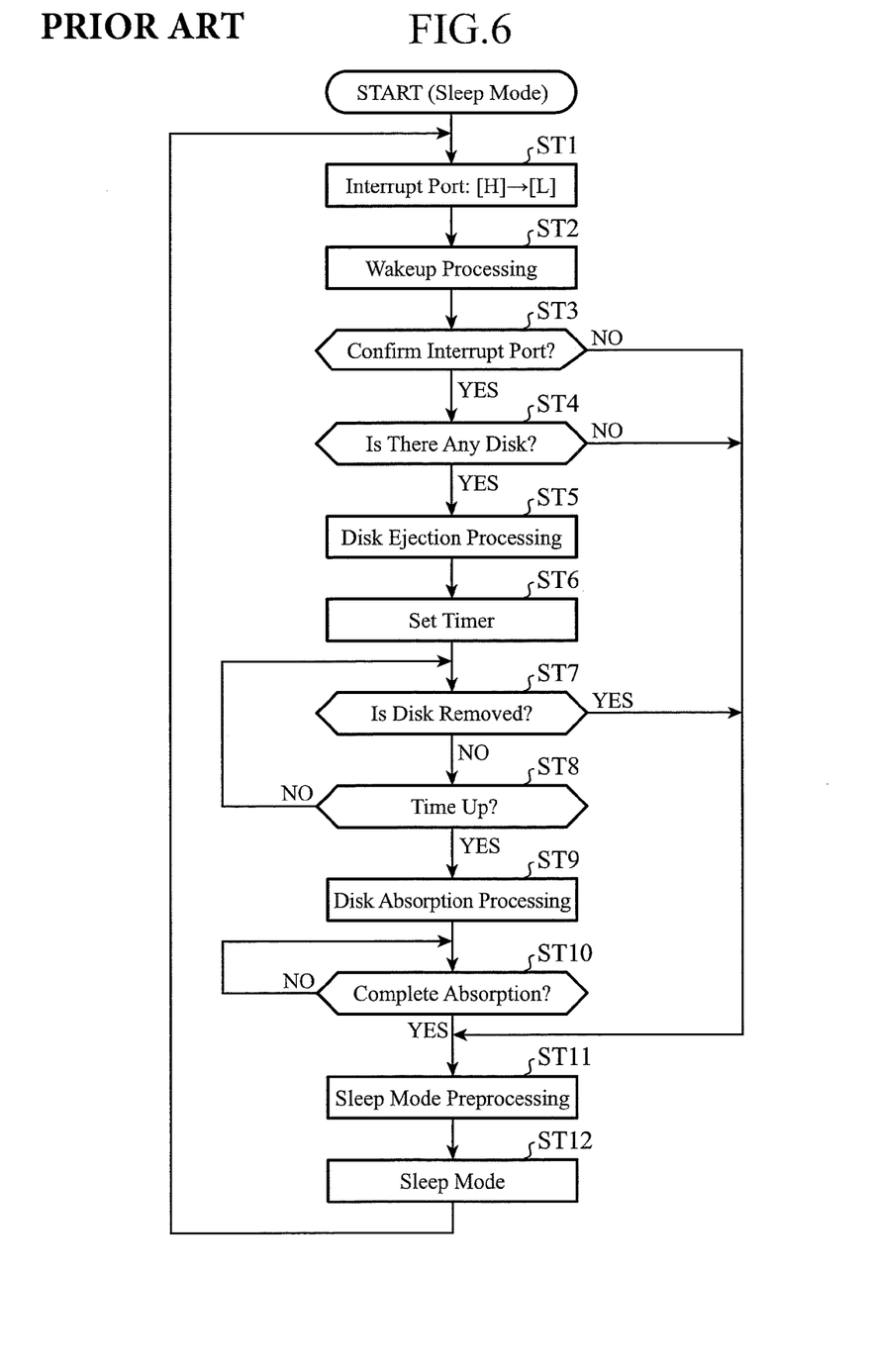
FIG. 6 is a flowchart showing the operation of a conventional micro.

FIG. 6 is a flowchart of the disk ejection processing while the conventional micro 1 is in the sleep mode. At step ST1 in the sleep mode, if the disk eject button 5 is pushed down and the push switch 4 changes its state from open to close, the external interrupt signal with the electric level [H]→[L] is input to the external interrupt port 2.

At the next step ST2, the micro 1 which receives the external interrupt signal executes the wakeup processing such as switching the clock from the low speed mode to the high speed mode.

At the next step ST3, the micro 1 checks whether the electric level of the external interrupt port 2 becomes [L] to confirm whether the disk eject button 5 is really pushed down or not. Unless it is [L] ("NO" at step ST3), it proceeds to step ST11. On the other hand, if it is [L] ("YES" at step ST3), it checks at the next step ST4 whether a disk remains in the onboard disk playback apparatus or not. For example, it is carried out by the micro 1 by storing the operation information about the absorption and ejection in its internal memory and by deciding on whether the disk is left or not by checking the information in the internal memory.

If no disk remains ("NO" at step ST4), the processing proceeds to step ST11. On the other hand, if the disk remains ("YES" at step ST4), the micro 1 executes the disk ejection processing at the next step ST5. Although the details of the disk ejection processing is omitted, the micro 1 can eject the disk using a well-known technique by driving the mechanical portion such as the disk carriage motor.

At the next step ST6, the micro 1 sets its internal timer to start counting, and decides on whether the disk is removed or not at the next step ST7. If the disk is removed ("YES" at step ST7), the processing proceeds to step ST11. On the other hand, unless the disk is removed ("NO" at step ST7), it checks at the next step ST8 whether the count value of the timer reaches a threshold (10 seconds, for example), and if it does not reach ("NO" at step ST8), the processing returns to step ST7. On the other hand, if the disk is not removed beyond a lapse of 10 seconds ("YES" at step ST8), it decides that the disk is ejected once without the intention of removing it, and executes the absorption processing of the disk at the next step ST9. The disk absorption processing can be carried out by a well-known technique as the foregoing ejection processing.

At the next step ST10, the micro 1 checks on whether it completes the disk absorption processing or not, and waits for the completion ("NO" at step ST10). When the absorption is completed ("YES" at step ST10), it executes the sleep mode preprocessing by stopping the disk during the playback or by stopping supplying power to the mechanical portion such as the disk carriage motor at the next step ST11.

At the next step ST12, the micro 1 switches the clock from the high speed mode to the low speed mode to move into the sleep mode, and continues the sleep mode until the next external interrupt signal is input.

Incidentally, although the detailed description will be omitted, when the disk eject button 5 is pushed down during the disk ejection processing at step ST5, the micro 1 can execute the disk absorption processing by detecting the electric level change [H]→[L] of the external interrupt port 2. Likewise, if the disk eject button 5 is pushed down during the disk absorption processing at step ST9, the micro 1 can execute the disk ejection processing by detecting the electric level change [H]→[L] of the external interrupt port 2.

In the onboard disk playback apparatus with the foregoing configuration, if the pull-up resistor 3 has bad contact or the push switch 4 has a failure, noise occurs continuously at the external interrupt port 2. As the noise occurring because of these causes, noise with the short duration of electric level [L] and noise with the comparatively long duration of [L] are conceivable.

1. A Case where Noise with the Short Duration of Electric Level [L] Continues for a Long Time Period.

The external interrupt port 2, to which the electric signal with the electric level [H] is input normally, is brought to the electric level [L] only when the disk eject button 5 is pushed down. However, if noise occurs, and the electric signal with its electric level changing [H]→[L]→[H] repeatedly is input, the micro 1 detects an external interrupt at the level change [H]→[L] (step ST1) and wakes up (step ST2). Next, when it reconfirms the electric level at the external interrupt port 2, the next [H] can occur because of the short [L] duration ("NO" at step ST3), it decides that the input electric signal is the noise with the short [L] duration and moves into the sleep mode again (steps ST11 and ST12). However, since the next electric signal with [H]→[L]→[H] is input to the external interrupt port 2, the micro 1 starts the processing from the step ST1 again, and wakes up.

In this way, the micro 1 repeats the sleep mode and waking up so that although it enters the sleep mode once, since it cannot continue the sleep mode, it remains in a large current consumption state, thereby bringing about battery run-down.

2. A Case where Noise with the Comparatively Long Duration of Electric Level [L] Continues for a Long Period.

If noise occurs, and the electric signal with its electric level changing [H]→[L]→[L]→[L]→[H] repeatedly is input to the external interrupt port 2, the micro 1 detects an external interrupt at the level change [H]→[L] (step ST1) and wakes up (step ST2). Next, when it reconfirms the electric level of the external interrupt port 2, since it is [L] ("YES" at step ST3), it recognizes that the disk eject button 5 is pushed down and proceeds to the disk ejection processing (steps ST4 and ST5). However, since the next electric signal with [H]→[L]→[L]→[L]→[H] is input to the external interrupt port 2, the micro 1 decides that the disk eject button 5 is pushed down during the disk ejection processing at step ST5, and executes the disk absorption processing. Furthermore, since the next [H]→[L]→[L]→[L]→[H] is input, the micro 1 decides that the disk eject button 5 is pushed down during the disk absorption processing at step ST9, and executes the disk ejection processing.

In this way, the ejection processing and absorption processing of the disk are repeated so that the micro 1 cannot move into the sleep mode, thereby continuing the large current consumption state and bringing about the battery run-down.

Thus as for an electronic control apparatus of a Patent Document 1, for example, when the external interrupt signal for a wakeup is input, even if the signal is noise, the electronic control apparatus operates its micro, first. At this time, the micro makes a decision as to whether the signal is normal or not, and proceeds to the regular operation only after deciding definitely that the signal is a normal signal. If the micro decides that it is the noise signal, it proceeds to the sleep mode at this point.

This makes it possible to minimize the operating time of the micro and to reduce the current consumption.

In addition, as for a microcomputer and a wakeup detection method of a Patent Document 2, for example, the micro samples the value of the external interrupt signal input to a micro terminal, decides that it is a normal signal when the sampled signal value exceeds a predetermined threshold twice in succession, and then wakes up.

This makes it possible to prevent the micro from waking up even if narrow noise is input, thereby being able to reduce its current consumption.

PRIOR ART DOCUMENT

Patent Document

Patent Document 1: Japanese Patent No. 3404219.
Patent Document 2: Japanese Patent Laid-Open No. 2006-215706.

DISCLOSURE OF THE INVENTION

Problems to be Solved by the Invention

However, the Patent Document 1 has a configuration of waking up once each time the noise is input. Accordingly, it has a problem of being unable to continue the sleep mode. In addition, in the Patent Document 2, although noise with the short duration is input does not wakeup the micro, noise with the comparatively long duration can wake it up, offering a problem of being unable to continue the sleep mode. Accordingly, the micros of both the Patent Documents 1 and 2 have a large consumption current state, which can cause battery run-down without taking any measures.

The present invention is implemented to solve the foregoing problems. Therefore it is an object of the present invention to continue, even if noise occurs in an electronic control apparatus which wakes up in response to an external interrupt signal in a sleep mode, the sleep mode by disabling the wakeup.

Means for Solving the Problems

An electronic control apparatus in accordance with the present invention comprises: an external interrupt port for accepting an input of an interrupt signal from outside; a control unit that wakes up from a sleep mode in response to the interrupt signal the external interrupt port accepts, and shifts from the sleep mode to an operation mode with greater current consumption; a wakeup timer for measuring time elapsed from a wakeup of the control unit; and an interrupt control unit for disabling acceptance of the interrupt signal input to the external interrupt port when the wakeup timer reaches a prescribed period of time, and for ignoring the interrupt signal after the disabling, wherein the control unit shifts from the operation mode to the sleep mode when the wakeup timer reaches the prescribed period of time, and does not wake up even if the interrupt signal is input from outside after shifting to the sleep mode.

In addition, an electronic control apparatus in accordance with the present invention comprises: an external interrupt port for accepting an input of an interrupt signal from outside; a control unit that wakes up from a sleep mode in response to the interrupt signal the external interrupt port accepts, and shifts from the sleep mode to an operation mode with greater current consumption; a wakeup counter for measuring a number of times of wakeups of the control unit; and an interrupt control unit for disabling acceptance of the interrupt signal input to the external interrupt port when the wakeup counter reaches a prescribed number of times, and for ignoring the interrupt signal after the disabling, wherein the control unit shifts from the operation mode to the sleep mode when the wakeup counter reaches the prescribed number of times, and does not wake up even if the interrupt signal is input from outside after shifting to the sleep mode.

In addition, onboard information equipment in accordance with the present invention incorporates one of the foregoing electronic control apparatuses.

Advantages of the Invention

According to the present invention, the electronic control apparatus, which wakes up in response to an interrupt signal in the sleep mode, measures the time elapsed from a wakeup from the sleep mode or measures the number of times of wakeups, and disables the reception of the interrupt signal input to the external interrupt port when reaching a prescribed period of time or the predetermined number of times, thereby ignoring the interrupt signal thereafter. Accordingly, it can proceed to the sleep mode forcefully by disabling the wakeup when noise occurs.

In addition, according to the present invention, the onboard information equipment incorporates the electronic control apparatus that shifts to the sleep mode forcefully by disabling a wakeup when the interrupt signal from the outside has noise. Accordingly, it can reduce the current consumption and prevent the battery run-down.

BEST MODE FOR CARRYING OUT THE INVENTION

The best mode for carrying out the invention will now be described with reference to the accompanying drawings to explain the present invention in more detail.

Embodiment 1

Figure 1:
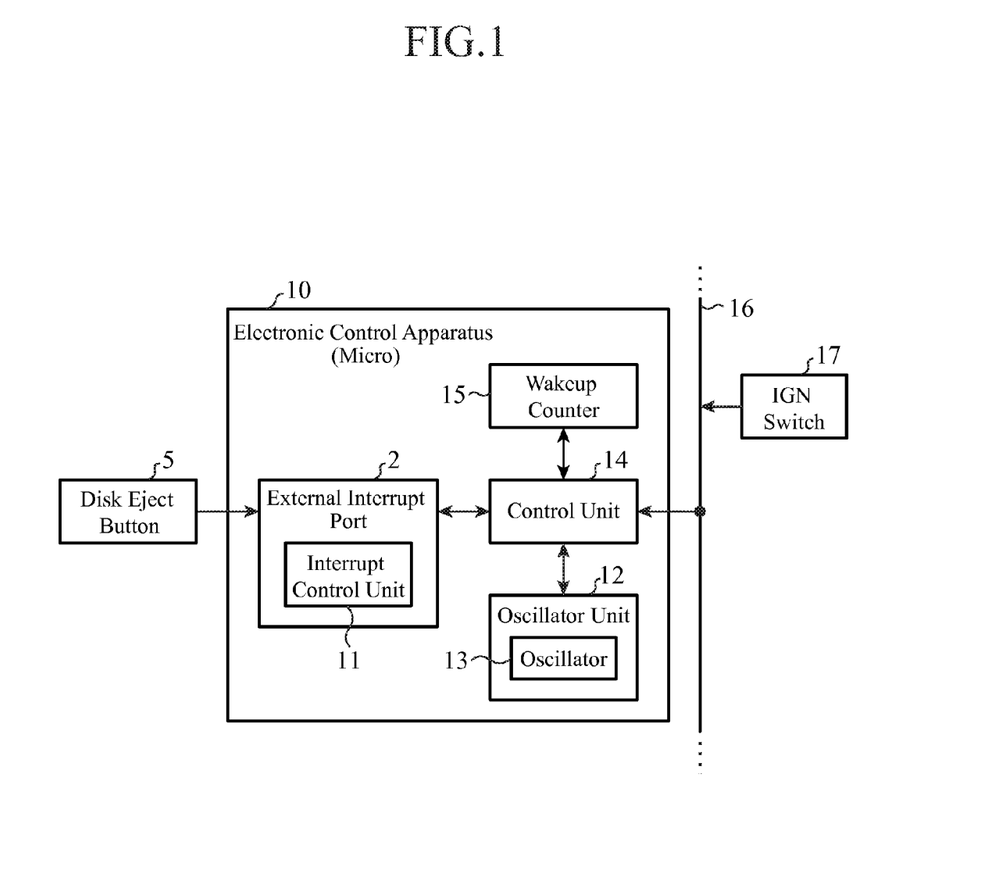
FIG. 1 is a block diagram showing a configuration of an electronic control apparatus of an embodiment 1 in accordance with the present invention.

The electronic control apparatus 10 shown in FIG. 1 corresponds to the micro 1 of FIG. 5 which is described previously, and is incorporated into an onboard disk playback apparatus (not shown). The electronic control apparatus 10 comprises an external interrupt port 2 including an interrupt control unit 11, an oscillator unit 12 including an oscillator 13, a control unit 14 that includes a CPU and controls the operation of an electronic control apparatus 10 (and the onboard disk playback apparatus), and a wakeup counter 15.

The electronic control apparatus 10 is supplied with power from a power supply with the voltage for the micro, which is stepped down from the onboard battery voltage, and receives the power not only in the regular operation mode, but also in the sleep mode for wakeup. However, if the oscillation of the clock is stopped because of starting the sleep mode, the current consumption is very small. In addition, although the onboard disk playback apparatus is supplied with the power that is stepped down from the onboard battery, it is the electronic control apparatus 10 that controls whether to supply the power or not. The electronic control apparatus 10 receives an IGN-on signal and IGN-off signal from an IGN switch 17 via a bus line 16 interconnecting the components of the onboard equipment in a vehicle, supplies the power to the onboard disk playback apparatus after a wakeup in response to the IGN on, and executes a regular operation mode like disk playback. In addition, after a wakeup owing to pushing down of the disk eject button 5 during the IGN off, it supplies the power to the onboard disk playback apparatus so as to enable disk ejection.

The disk eject button 5 of the onboard disk playback apparatus is the same as the disk eject button 5 in FIG. 5, which comprises the pull-up resistor 3 and push switch 4. When the disk eject button 5 is pushed down, the push switch 4 operates from open to close and supplies an external interrupt signal with the electric level [H]→[L] to the external interrupt port 2 of the electronic control apparatus 10.

Although it is assumed here that an object ejected with the disk eject button 5 is a disk-like medium such as a CD and DVD (Digital Versatile Disc), it is not essential. For example, a medium with any shape such as a multimedia card, MD (Mini Disc) and cassette tape is also possible.

The external interrupt port 2, which corresponds to the external interrupt port 2 in FIG. 5, is a port for receiving an external interrupt signal input from the disk eject button 5. However, the external interrupt port 2 of the present embodiment 1 has a new interrupt control unit 11, and the interrupt control unit 11 "enables" or "disables" the external interrupt in accordance with an instruction from the control unit 14. The external interrupt port 2 accepts the external interrupt signal input from the disk eject button 5 when the external interrupt is "enabled", and notifies the control unit 14 of it. On the other hand, when it is "disabled", even if the external interrupt signal is input, it does not accepts it or notify the control unit 14.

Incidentally, as for the release of the "disabled" state of the external interrupt to the interrupt control unit 11, it is executed on the condition that the IGN switch 17 brings from IGN off to IGN on.

Receiving a wakeup instruction or sleep mode instruction from the control unit 14, the oscillator unit 12 starts or stops the oscillation of the oscillator 13 in accordance with the instruction content, and supplies the clock for operating the CPU to the control unit 14.

The control unit 14 wakes up in response to the IGN-on signal of the IGN switch 17 or wakes up in response to the external interrupt signal from the disk eject button 5.

Receiving the IGN-on signal in the sleep mode, the control unit 14 confirms the external interrupt setting of the interrupt control unit 11, and when it is "disabled", it "enables" it and wakes up. In addition, receiving the IGN-off signal from the IGN switch 17 via the bus line 16 while it executes the regular operation after a wakeup, it "enables" the external interrupt to the interrupt control unit 11, and shifts to the sleep mode. By "enabling" it, the control unit 14 can detect the external interrupt caused by pressing the disk eject button in the sleep mode and wake up.

In addition, to achieve the Anytime-Eject function, when receiving the external interrupt signal from the disk eject button 5 in the sleep mode, the control unit 14 temporarily wakes up, executes the disk ejection processing and absorption processing of the onboard disk playback apparatus, and proceeds to the sleep mode again.

The wakeup counter 15 counts the number of times of wakeups of the control unit 14 from the sleep mode in response to the external interrupt signal. The count value is reset to its initial value 0 during a period of on→off of the IGN switch 17 (immediately after switching from the IGN off to IGN on in the sleep mode, for example).

Next, the operation of the electronic control apparatus 10 of the embodiment 1 will be described.

To prevent the repetition of the sleep mode and wakeup or the repetition of the disk ejection and absorption when noise is input to the external interrupt port 2 during the sleep mode while the IGN switch 17 is off, the present embodiment 1 causes the wakeup counter 15 to count the number of times of the wakeups and limits the number of times of the wakeups.

Figure 2:
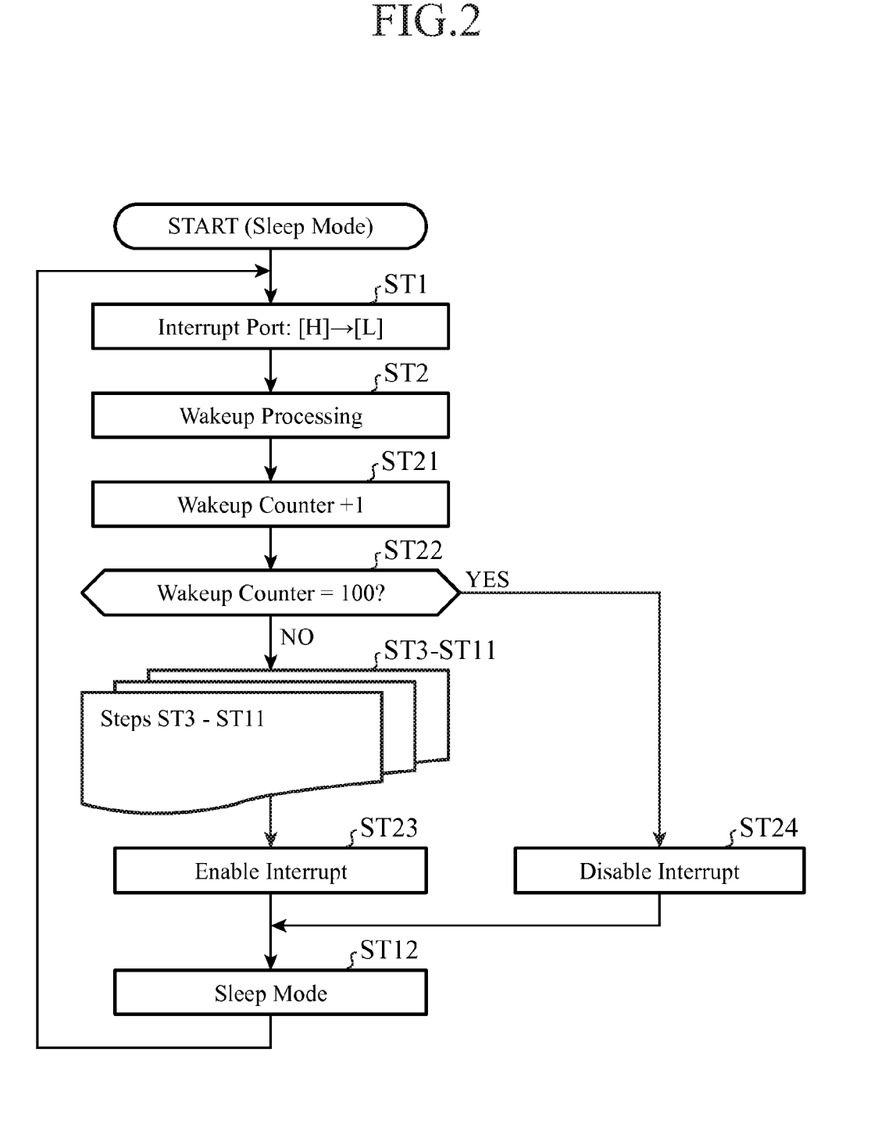
FIG. 2 is a flowchart showing the operation of the electronic control apparatus of the embodiment 1.

FIG. 2 is a flowchart of the disk ejection processing when the electronic control apparatus 10 is in the sleep mode. Since steps ST1-ST12 shown in FIG. 2 are the same as steps ST1-ST12 of FIG. 5, detailed description of them will be omitted. In addition, it is assumed that before moving into the sleep mode, it "enables" the external interrupt to the interrupt control unit 11, and sets the count value of the wakeup counter 15 at the initial value 0.

If the disk eject button 5 is pushed down at step ST1 in the sleep mode, the external interrupt signal with its electric level changing [H]→[L] is input to the external interrupt port 2. Here, since the external interrupt to the interrupt control unit 11 is "enabled", the external interrupt port 2 accepts the input and notifies the control unit 14.

At the next step ST2, the control unit 14 receives the notification from the external interrupt port 2, and issues the instruction to the oscillator unit 12 to carry out the wakeup processing such as switching the clock to the high speed mode.

At the next step ST21, the control unit 14 increments the count value of the wakeup counter 15 by one, and stores the number of times of wakeups from the sleep mode during the IGN off.

At the next step ST22, the control unit 14 makes a decision on whether the count value of the wakeup counter 15 reaches the predetermined number of times (100, for example). If the count value is less than the predetermined number of times ("NO" at step ST22), the control unit 14 executes the following steps ST3-ST11 successively to cause the onboard disk playback apparatus to execute the ejection processing and absorption processing of the disk.

At the next step ST23, while maintaining the external interrupt to the interrupt control unit 11 at the "enabled" state, the control unit 14 shifts to the sleep mode at step ST12.

If the next external interrupt signal with its electric level changing [H]→[L] is input to the external interrupt port 2, since the external interrupt to the interrupt control unit 11 is "enabled", the control unit 14 receives the signal and wakes up, and the wakeup counter 15 adds one to the previous count value.

On the other hand, if the count value of the wakeup counter 15 reaches 100, that is, if the number of times of the wakeups from the sleep mode arrives at 100 ("YES" at step ST22), the control unit 14 makes a decision that the external interrupt signal is not normal, but has noise, and "disables" the external interrupt to the interrupt control unit 11 at the next step ST24 so as to prevent the wakeup in response to the external interrupt signal thereafter. Then it shifts to the sleep mode at step ST12.

Even if the next external interrupt signal with its electric level changing [H]→[L] is input to the external interrupt port 2, since the external interrupt to the interrupt control unit 11 is "disabled", the signal is ignored. Accordingly, the electronic control apparatus 10 does not wake up and continues the sleep mode forcefully.

Although not shown in FIG. 2, the "disabled" external interrupt is released when the IGN switch 17 is turned on in the sleep mode as described above. More specifically, when the control unit 14 receives the IGN-on signal from the IGN switch 17 via the bus line 16, it "enables" the external interrupt to the interrupt control unit 11 and returns the count value of the wakeup counter 15 to its initial value 0. If the disk eject button 5 is pushed down in this state, the control unit 14 receives the external interrupt signal from the external interrupt port 2 and executes the disk ejection processing.

In this way, by limiting the number of times of wakeups from the sleep mode, the electronic control apparatus 10 can continue the sleep mode without waking up even if the external interrupt signal with its level changing [H]→[L] is input to the external interrupt port 2. As a result, since it can maintain the current consumption at a reduced level, it can prevent the battery run-down.

As described above, according to the embodiment 1, the electronic control apparatus 10 of the onboard disk playback apparatus comprises the external interrupt port 2 for accepting the input of the external interrupt signal from the disk eject button 5; the control unit 14 that wakes up from the sleep mode in response to the external interrupt signal received via the external interrupt port 2, and shifts from the sleep mode to the operation mode with greater current consumption; the wakeup counter 15 for counting the number of times of wakeups of the control unit 14; and the interrupt control unit 11 for "disabling" the external interrupt signal input to the external interrupt port 2 when the wakeup counter 15 reaches the predetermined number of times and for ignoring the external interrupt signal thereafter. As a result, even if noise occurs in the external interrupt signal, the present embodiment 1 can disable the wakeup and continue the sleep mode. Accordingly, it can reduce the current consumption and prevent the battery run-down. The present embodiment 1 has a marked effect particularly when the noise with the short duration of electric level [L] occurs repeatedly, and the sleep mode and wakeups are repeated.

In addition, according to the embodiment 1, the control unit 14 is configured in such a manner that when the wakeup counter 15 reaches the predetermined number of times, it shifts from the regular operation mode to the sleep mode. Accordingly, if noise occurs in the external interrupt signal, it can proceed to the sleep mode forcefully, reduce the current consumption and prevent the battery run-down.

Embodiment 2

Figure 3:
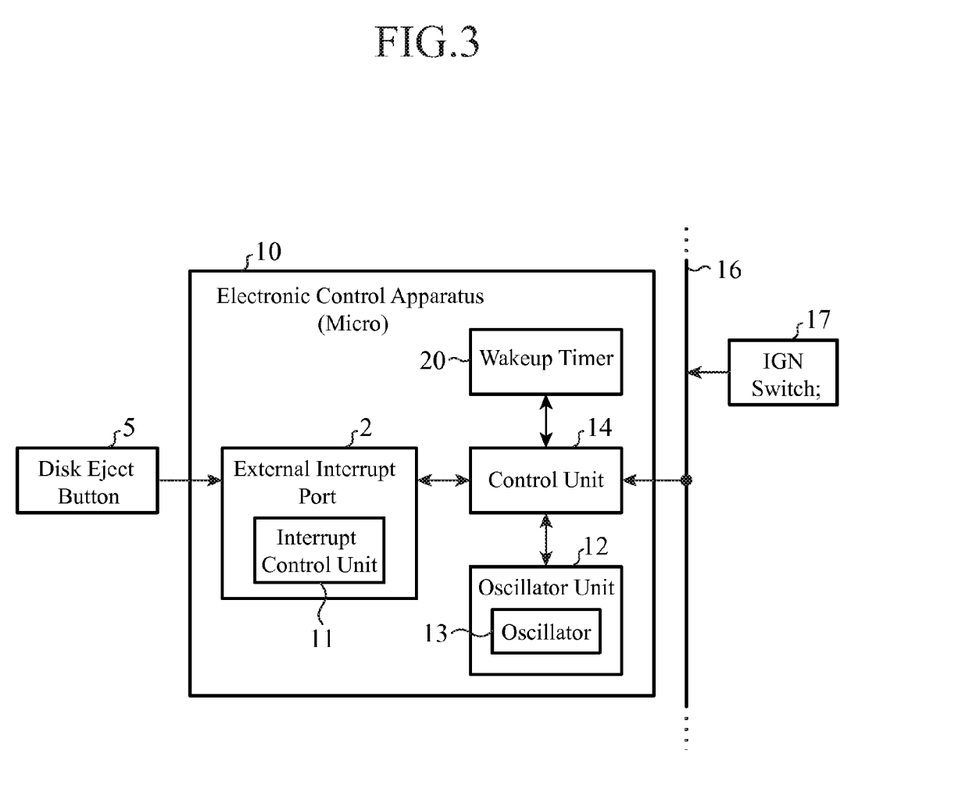
FIG. 3 is a block diagram showing a configuration of an electronic control apparatus of an embodiment 2 in accordance with the present invention.

The electronic control apparatus 10 shown in FIG. 3 has a configuration comprising a wakeup timer 20 instead of the wakeup counter 15 of the electronic control apparatus 10 of the embodiment 1. Since the other components are the same as those of FIG. 1, they are designated by the same reference numerals and their description will be omitted.

The wakeup timer 20 is a timer for measuring the duration in which the control unit 14 continues a wakeup state in response to the external interrupt signal in the off state of the IGN switch 17. The count value is reset to its initial value 0 during a period of on→off of the IGN switch 17 (immediately after turned on from the IGN off to IGN on in the sleep mode, for example).

Next, the operation of the electronic control apparatus 10 of the embodiment 2 will be described.

To prevent the repetition of the sleep mode and wakeup or the repetition of the disk ejection and absorption when noise is input to the external interrupt port 2 during the sleep mode while the IGN switch 17 is off, the present embodiment 2 causes the wakeup timer 20 to measure the integral wakeup time and limits the duration of the wakeup.

Figure 4:
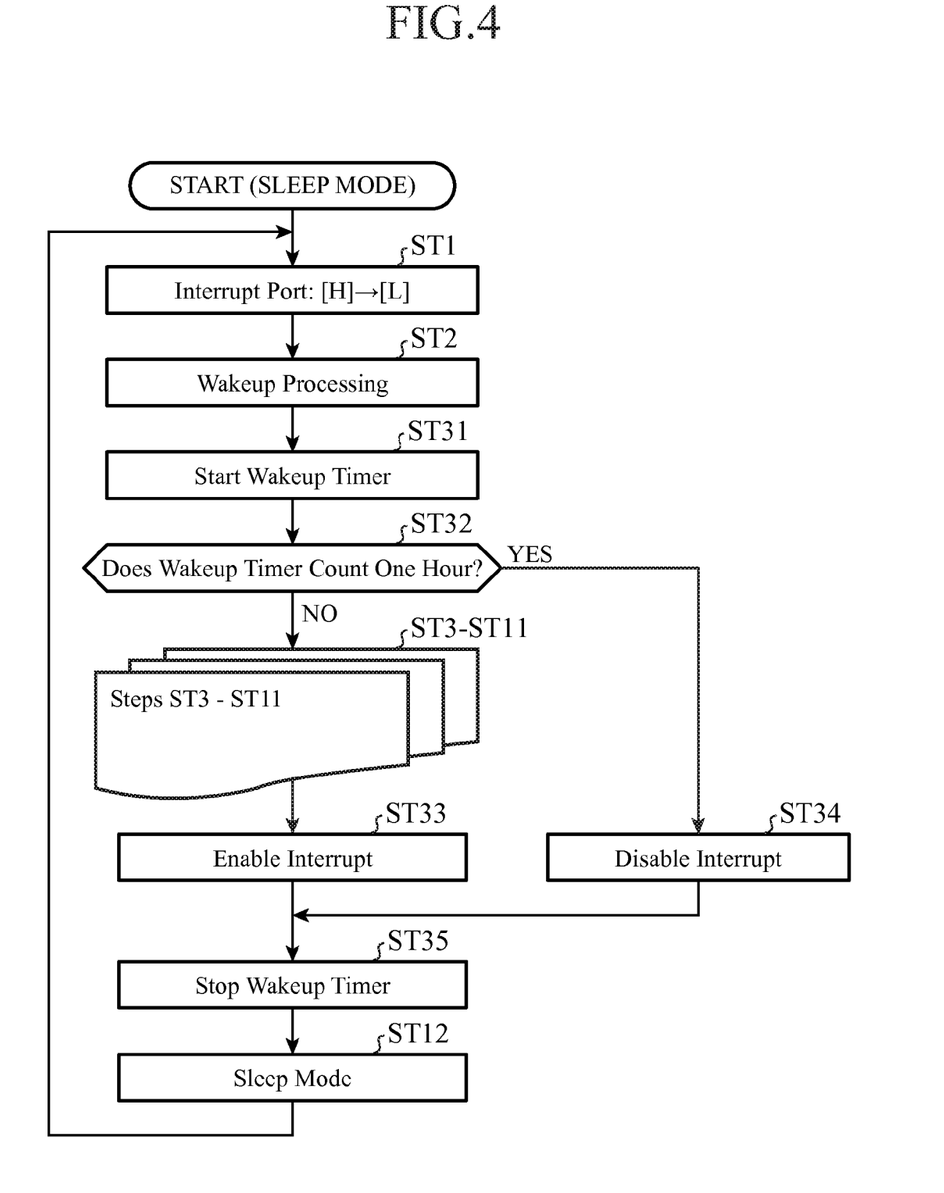
FIG. 4 is a flowchart showing the operation of the electronic control apparatus of the embodiment 2.

FIG. 4 is a flowchart of the disk ejection processing when the electronic control apparatus 10 is in the sleep mode. Since steps ST1-ST12 shown in FIG. 4 are the same as steps ST1-ST12 of FIG. 2 and FIG. 5, detailed description of them will be omitted. In addition, it is assumed that before moving into the sleep mode, it "enables" the external interrupt to the interrupt control unit 11, and sets the count value of the wakeup timer 20 at the initial value 0.

The control unit 14 starts the operation of the wakeup timer 20 at step ST31 at which it wakes up from the sleep mode, and the wakeup timer 20 measures the time period of the wakeup.

At the next step ST32, the control unit 14 decides on whether the wakeup timer 20 measures a predetermined period (one hour, for example) or not. When the count value of the wakeup timer 20 is less than the predetermined period ("NO" at step ST32), the control unit 14 executes step ST3-ST11 successively to cause the onboard disk playback apparatus to execute the ejection processing and absorption processing of the disk.

At the next step ST33, the control unit 14 "enables" the external interrupt to the interrupt control unit 11, stops the operation of the wakeup timer 20 at step ST35, and shifts to the sleep mode at step ST12.

If the next external interrupt signal with its electric level changing [H]→[L] is input to the external interrupt port 2, since the external interrupt to the interrupt control unit 11 is "enabled", the control unit 14 receives the signal and wakes up, and the wakeup timer 20 continues counting from the previous count value.

On the other hand, if the count value of the wakeup timer 20 reaches one hour, that is, if the integral time elapsed from the wakeup from the sleep mode becomes one hour ("YES" at step ST32), the control unit 14 makes a decision that the external interrupt signal is not normal, but has noise, and "disables" the external interrupt to the interrupt control unit 11 at the next step ST234 so as to prevent the wakeup in response to the external interrupt signal thereafter.

At the next step ST35, the control unit 14 stops the operation of the wakeup timer 20, and shifts to the sleep mode at step ST12.

Even if the next external interrupt signal with its electric level changing [H]→[L] is input to the external interrupt port 2, since the external interrupt to the interrupt control unit 11 is "disabled", the signal is ignored. Accordingly, the electronic control apparatus 10 does not wake up and continues the sleep mode forcefully.

Although not shown in FIG. 4, the "disabled" external interrupt is released when the IGN switch 17 is turned on in the sleep mode as described above. More specifically, when the control unit 14 receives the IGN-on signal from the IGN switch 17 via the bus line 16, it "enables" the external interrupt to the interrupt control unit 11 and returns the count value of the wakeup timer 20 to its initial value 0. If the disk eject button 5 is pushed down in this state, the control unit 14 receives the external interrupt signal from the external interrupt port 2 and executes the disk ejection processing.

In this way, by limiting the period of time of continuing the wakeup state from the sleep mode, the electronic control apparatus 10 can continue the sleep mode without waking up even if the external interrupt signal with its level changing [H]→[L] is input to the external interrupt port 2. As a result, since it can maintain the current consumption at a reduced level, it can prevent the battery run-down.

As described above, according to the embodiment 2, the electronic control apparatus 10 of the onboard disk playback apparatus comprises the wakeup timer 20 for measuring the time elapsed from the wakeup of the control unit 14; and the interrupt control unit 11 is configured in such a manner as to "disable" the external interrupt signal input to the external interrupt port 2 when the wakeup timer 20 reaches the predetermined period of time and to ignore the external interrupt signal thereafter. As a result, even if noise occurs in the external interrupt signal, the present embodiment 2 can disable the wakeup and continue the sleep mode. Accordingly, it can reduce the current consumption and prevent the battery run-down. The present embodiment 2 has a marked effect particularly when the noise with the short duration of electric level [L] occurs repeatedly and the sleep mode and wakeup are repeated, and thus the disk ejection and absorption are made alternately and the electronic control apparatus 10 cannot shift to the sleep mode.

In addition, according to the embodiment 2, the control unit 14 is configured in such a manner that when the wakeup timer 20 reaches the predetermined period of time, it shifts from the regular operation mode to the sleep mode. Accordingly, if noise occurs in the external interrupt signal, it can proceed to the sleep mode forcefully, reduce the current consumption and prevent the battery run-down.

Incidentally, although the foregoing embodiments 1 and 2 are configured in such a manner as to limit the number of times of the wakeups or the period of time of the wakeup in response to the external interrupt signal in the sleep mode, a configuration is also possible which comprises both the wakeup counter 15 and the wakeup timer 20 and limits both the number of times and the period of time. In this case, it can shift to the sleep mode by "disabling" the external interrupt to the interrupt control unit 11 when the number of times or the period of time reaches the upper limit or when both the number of times and the period of time reach the upper limits.

In addition, although the foregoing embodiments 1 and 2 use the external interrupt signal, which the disk eject button 5 of the onboard disk playback apparatus outputs, as the signal for a wakeup, it goes without saying that the present invention is applicable to a case of using an electric signal output from a button or switch other than the disk eject button 5. In addition, it goes without saying that the present invention is applicable to a case of using a port other than the external interrupt port 2 in the electronic control apparatus 10.

In the development and manufacture process of the electronic control apparatus 10, for example, there are some cases where a switch outputting on/off is connected to a port of the electronic control apparatus 10 so as to switch the sleep and wakeup of the electronic control apparatus 10 in response to the output signal of the switch instead of the IGN on/off signal of the IGN switch 17. The present invention is also applicable to the case where the switch is connected. In addition, although the switch is removed after completing the electronic control apparatus 10, since the port for the connection is left, it can prevent a wakeup due to noise input to the port.

Other than the foregoing description, a free combination of the individual embodiments, variations of any components of the individual embodiments or removal of any components of the individual embodiments are possible within the scope of the present invention.

INDUSTRIAL APPLICABILITY

As described above, an electronic control apparatus in accordance with the present invention is configured in such a manner as to shift to the sleep mode forcefully by limiting one or both of the number of times of the wakeups and the period of time of the wakeup. Accordingly, it is suitable for an application to onboard information equipment such as onboard audiovisual equipment and onboard navigation equipment which receive power supply from a battery.

DESCRIPTION OF REFERENCE NUMERALS

1 micro, 2 external interrupt port, 3 pull-up resistor, 4 push switch, 5 disk eject button, 10 electronic control apparatus, 11 interrupt control unit, 12 oscillator unit, 13 oscillator, 14 control unit, 15 wakeup counter, 16 bus line, 17 IGN switch, 20 wakeup timer.

What is claimed is:

1. An electronic control apparatus configured to be mounted on a vehicle and supplied power from a power supply via an onboard battery of the vehicle, comprising:
    an external interrupt port for accepting an input of an interrupt signal from outside after an ignition switch of the vehicle is turned off;
    a control unit that wakes up from a sleep mode while the ignition switch remains off in response to the interrupt signal the external interrupt port accepts, and shifts from the sleep mode to an operation mode with greater current consumption;
    a wakeup counter for measuring a number of times of wakeups of the control unit since the ignition switch was turned off until the ignition switch is turned back on; and
    an interrupt control unit for disabling acceptance of the interrupt signal input to the external interrupt port while the ignition switch remains off when the wakeup counter reaches a prescribed number of times, and for ignoring the interrupt signal after the disabling until the ignition switch is turned back on, wherein
    the control unit shifts from the operation mode to the sleep mode when the wakeup counter reaches the prescribed number of times while the ignition switch remains off, and does not wake up while the ignition switch remains off even if the interrupt signal is input from outside after shifting to the sleep mode.

2. The electronic control apparatus as defined in claim 1, wherein the electronic control apparatus is installed as onboard information equipment.

3. An electronic control apparatus installed within a vehicle comprising:
    an external interrupt port to accept an input of an interrupt signal from outside after an ignition switch of the vehicle is turned off;
    a controller to wake up from a sleep mode while the ignition switch remains off in response to the interrupt signal the external interrupt port accepts, and shifts from the sleep mode to an operation mode with greater current consumption;
    a wakeup counter to measure a number of times of wakeups of the controller since the ignition switch was turned off until the ignition switch is turned back on; and
    an interrupt controller to disable acceptance of the interrupt signal input to the external interrupt port while the ignition switch remains off when the wakeup counter reaches a prescribed number of times, and for ignoring the interrupt signal after the disabling until the ignition switch is turned back on, wherein
    the controller shifts from the operation mode to the sleep mode when the wakeup counter reaches the prescribed number of times while the ignition switch remains off, and does not wake up while the ignition switch remains off even if the interrupt signal is input from outside after shifting to the sleep mode, and
    when the ignition switch of the vehicle is turned back on:
        the interrupt controller enables acceptance of the interrupt signal input to the external interrupt port to accept the interrupt signal after the enabling; and
        the wakeup counter resets a value of the number of times.

4. An electronic control apparatus configured to be mounted on a vehicle and supplied power from a power supply via an onboard battery of the vehicle, comprising:
    an external interrupt port to accept an input of an interrupt signal from outside after an ignition switch of the vehicle is turned off;
    a controller to wake up from a sleep mode while the ignition switch remains off in response to the interrupt signal the external interrupt port accepts, and to shift from the sleep mode to an operation mode with greater current consumption;
    a wakeup counter to measure a number of times of wakeups of the controller since the ignition switch was turned off until the ignition switch is turned back on; and
    an interrupt controller to disable acceptance of the interrupt signal input to the external interrupt port while the ignition switch remains off when the wakeup counter reaches a prescribed number of times, and to ignore the interrupt signal after the disabling until the ignition switch is turned back on, wherein
    the controller shifts from the operation mode to the sleep mode when the wakeup counter reaches the prescribed number of times while the ignition switch remains off, and does not wake up while the ignition switch remains off even if the interrupt signal is input from outside after shifting to the sleep mode.

* * * * *